Patented Feb. 5, 1935

1,989,758

UNITED STATES PATENT OFFICE 1,989,758

MILK AND CHOCOLATE SUSPENSION

David E. Linn, La Grange, Ill., assignor to International Patents Development Company, Wilmington, Del., a corporation of Delaware No Drawing. Application January 23, 1933
Serial No. 653,168

19 Claims. (Cl. 99—11)

This invention relates to the manufacture of chocolate beverages and particularly to milk and chocolate mixtures in which substances of a colloidal character are used to keep the chocolate in suspension.

It has been proposed to use agar-agar, or other vegetable, or animal gum of like character, for this purpose. It has also been proposed to use starches of one kind or another.

This invention is based upon the discovery that new and unexpected improvements in process and product result from the use of both the starch and gum ingredients in certain rather limited proportions; the quantity of the gum being very much smaller than the quantity of the starch. These substances function as thickeners, increasing the specific gravity and the viscosity of the fluid vehicle, and also in a distinctly different way as protective colloids. Apparently the starch acts primarily as a thickener and only to a small extent as a protective colloid. The gum acts almost entirely as a protective colloid; it does not, in the amounts used, appreciably thicken the milk.

If starch be used alone it is necessary, in order to give the liquid vehicle the requisite capacity for suspending the chocolate particles, to cook the mixture at such a high temperature, in order to thoroughly gelatinize the starch, that a large part of the milk proteins are coagulated. This gives a product which is likely to have a cooked taste and which is thicker than is desirable for a beverage.

Only a small amount of the gum, agar-agar for example, will remain dispersed in the milk. If larger amounts are used, the excess will segregate in jelly-like lumps. It is not practical, or at least conducive to the best results, to use agar-agar, or other like gum, alone. If, however, a small amount of the gum be introduced into the milk and chocolate mixture, in addition to the starch, such mixture can be stabilized, to keep the starch particles in suspension, by heating at such relatively low temperatures that small quantities only of the milk proteins are coagulated and a relatively thin liquid results instead of the heavy cream-like mixtures which have heretofore been produced in an effort to prevent segregation and stratification of the chocolate. Apparently under these low temperature conditions the starch is only partially gelatinized. The cell integuments are disrupted but the contents of the cells not completely discharged and dispersed. In this condition, the starch may in time settle down through the milk, thinning the liquid vehicle so that the chocolate particles also will be deposited, in part at least. If, however, a very small amount of gum, such as agar-agar, be added with the starch, even in its partially gelatinized state, it seems to keep the starch in suspension. The gum acting as a protective colloid in respect to the starch keeps the same in suspension in the liquid and is therefore termed herein a stabilizing gum while the starch through its thickening function, keeps the chocolate from settling out. Whether this theory is correct or not, the use of a small, even a very small, quantity of the gum in addition to the starch results in important advantages: The duration of suspension of the chocolate is increased; lower temperatures can be used in processing the mixture; the resultant product is more fluent; because of the decreased amount of coagulation of the milk proteins the beverage is more digestible; and because of the low temperature of the heating the flavor is improved.

The term "chocolate", as used herein, is intended to include cocoa as well as chocolate in the strict sense of the word.

So far as I am aware, any vegetable or animal gum that will swell in water may be used as the protective colloid or stabilizing gum, for example agar-agar, (which is preferred) gelatin, gum arabic, gum tragacanth, and pectins (Irish moss, citrus pectin, apple pectin).

My experience goes to show that these substances may be substituted one for another weight for weight.

All starches may be employed (but not always in like quantities or without some change in process) such as corn starch, arrow-root starch, wheat starch, tapioca starch.

In respect to raw starches of all kinds, including corn starch, the amounts of the starch ingredients will vary, approximately, in inverse proportion to their viscosities, measured by the Scott test (time in seconds of duration of flow of 100 cc. through an orifice of .01 sq. in. cross-sectional area). This rule does not hold good, however, for modified starches.

Where corn starch is used, better results are obtained by employing starches that are appreciably modified by acid or alkali treatments. These treatments weaken the integument of the starch cells, apparently, thus facilitating gelatinization during the cooking step, so that a lesser amount than expected may be used.

If a certain quantity of raw corn starch, having a Scott test say of 90 to 105, is required it may be replaced by, and the same suspending effect obtained with, a like quantity of modified corn starch having a Scott test of say 55 to 65 for the reasons above stated. The use of the modified starch, however, gives a somewhat thinner beverage with an improved suspension and less liability to starch taste. A low cooking temperature may be used or the time of cooking diminished.

Assuming that raw corn starch, as made by acid or alkali process, may be considered to have hydrogen ion concentrations within the range of pH equals 4.5 and 5.5, starches modified by specific alkali treatment may be used, and advantageously used in place of raw corn starch, having alkalinities up to pH equals 9 or 10; or, on the other hand, acid modified starches may be used having pH values down to 3.5 or 4.

In carrying out the process of making the milk starch emulsion, the chocolate, sugars, (when the latter are used) starch, and the gum may be introduced, as dry substances, into the milk, thoroughly mixed, and the mixture heated to a temperature of 170° to 200° F., or higher if desired—although this is not necessary—in place of temperatures approximating 240° F. heretofore recommended, for periods from 20 to 30 minutes, more or less. Preferably, however, a sirup is first made of the chocolate and sugar, and this sirup, together with a preformed mixture, in proper proportions, of the starch and gum, added to the milk and the final mixture agitated and heated as described.

As a matter of convenience to the beverage manufacturer, and in order to insure correct proportions between starch and gum, the starch and gum may be compounded together and the compound delivered to the beverage manufacturer.

In making the compound the agar-agar, for example, is preferably ground dry and screened to the same degree of fineness as the starch and is then thoroughly mixed with the starch in the proportions indicated by the specific examples given below. In such a mixture the agar-agar, although very small in quantity, approximately from 1 to 20 parts of agar to 100 parts of starch, will remain evenly distributed in the starch. It will not sift out. This novel mixture will disperse in the chocolate vehicle much more easily than if the ingredients were introduced into the liquid as separate substances. If the agar is not finely ground it will swell instead of dissolving, particularly at the low temperatures preferably used in compounding, with consequent loss of stabilizing power.

The following examples of typical mixtures, with preferred percentages of the ingredients, will serve to illustrate the character of the present invention. The percentages are by weight.

Example 1

| | Percent |
|---|---|
| Milk | 90.48 |
| Cane Sugar | 4.82 |
| Dextrose (Cerelose) | 2.41 |
| Cocoa (high grade, dark) | 1.27 |
| Raw tapioca starch (Scott test 150) | 1.00 |
| Agar-agar | 0.02 |
| Total | 100.00 |

Any suitable sugars may be used in the suspension or in the dry product or the sugar ingredient may be omitted if desired. The amount of the sugar ingredient may be varied to any extent. For any usable quantity the sugar does not add to the viscosity of the beverage. The amount of cocoa or chocolate may also be varied. The matter of taste or of economy will govern any increase or decrease. As much as 2.5% of cocoa may be used without changing the percentage of starch or gum. The starch ingredient may be increased to two or three per cent. My experience goes to show that one per cent is near the critical lower limit. More than two or three per cent gives too high a viscosity and is likely to give a distinct starch taste to the product. The gum, agar-agar, may be varied in amount from about 0.01% to 0.2%, but at the upper limit there would be a strong tendency to segregation in jelly-like lumps.

Example 2

| | Percent |
|---|---|
| Milk | 90.78 |
| Cane sugar | 4.06 |
| Cerelose | 2.03 |
| Cocoa (cheaper quality than in Example 1) | 1.673 |
| Raw corn starch (Scott test 100) | 1.433 |
| Gum | .024 |
| Total | 100.00 |

The first four items may be varied as indicated in Example 1.

The same quantity of modified corn starch may be used in place of the specified raw corn starch. The amount of corn starch may vary between 1 and 2%. Where raw corn starch is used the lower limit of the gum quantity should not be quite as low as in Example 1.

Example 3

| | Percent |
|---|---|
| Milk | 91.00 |
| Cane sugar | 4.07 |
| Cerelose | 2.03 |
| Cocoa | 1.676 |
| Wheat starch (Scott test 85) | 1.2 |
| Gum | 0.024 |
| Total | 100.00 |

The variations may be substantially the same as with Example 1.

The time of cooking with the raw corn starch should be ordinarily 25 to 30 minutes; with the modified corn starch 20 to 25 minutes; with the tapioca and wheat starches about 20 minutes.

It will be understood that these examples are purely typical and illustrative.

In Example 2 the temperature should be somewhat higher when raw starch is used than with modified starch. The modification weakens the integuments of the starch cells, without disrupting them, so that the required but incomplete gelatinization will take place more readily than in the case of raw starch. While it would be possible to heat to the relatively high temperatures ordinarily used in making chocolate starch suspensions, these high temperatures produce a thickness of the product which ordinarily is very undesirable. By keeping the temperature at 200° F. or below, the milk albumen will be coagulated but there will be no substantial coagulation of the casein. The milk is, therefore, sterilized or pasteurized, so as to improve its keeping qualities, without greatly increasing its thickness. This low temperature will gelatinize the starch sufficiently so that, with the employment of the gum, as a protective colloid, the chocolate particles will be stabilized in the suspension through stabilization of the starch.

As a matter of convenience and to avoid circumlocution, the term "stabilizing gum" is used in the claims as meaning an animal or vegetable gum of the type described which is capable of swelling in water and functioning as a prospective colloid.

The examples above given are to be regarded as merely typical and illustrative. The intention is to claim all modifications of process and product within the scope of the appended claims.

No claim is made herein to the stabilizing compound itself, as that is claimed in a subsequent application of the applicant, Serial No. 709,327, filed February 1, 1934 (for which application, Serial No. 738,592, filed August 6, 1934, has been substituted).

I claim:

1. Method of making a stable chocolate suspension which consists in adding to the liquid vehicle starch and a much smaller quantity of a stabilizing gum, and heating the mixture to gelatinize the starch.

2. Method of making a stable chocolate suspension which consists in adding to the liquid vehicle modified corn starch and a much smaller quantity of a stabilizing gum, and heating the mixture to gelatinize the starch.

3. Method of making a stable chocolate suspension which consists in adding to the liquid vehicle from one to three per cent of starch and from 0.01% to 0.2% of a stabilizing gum, and heating the mixture to gelatinize the starch.

4. Method of making a stable chocolate and milk suspension which consists in adding to the mixture of milk and chocolate, starch and a much smaller quantity of a stabilizing gum, and heating the mixture to a temperature above the gelatinizing temperature of starch and below the temperature at which the casein in the milk coagulates.

5. Method of making a stable chocolate and milk suspension which consists in adding to the mixture of milk and chocolate, starch and a stabilizing gum in amount between one part and twenty parts of the gum to one hundred parts of the starch, and heating the mixture to a temperature above the gelatinizing temperature of starch and below the temperature at which the casein in the milk coagulates.

6. Method of making a stable chocolate and milk suspension which consists in adding to the mixture of milk and chocolate, starch and a stabilizing gum in amount between one part and twenty parts of the gum to one hundred parts of the starch, and heating the mixture to a temperature between 170° and 200° F.

7. Method of making a stable chocolate and milk suspension which consists in adding to the mixture of milk and chocolate modified corn starch and a much smaller quantity of a stabilizing gum, and heating the mixture to a temperature above the gelatinizing temperature of starch and below the temperature at which the casein in the milk coagulates.

8. Method of making a stable chocolate and milk suspension which consists in adding to the mixture of milk and chocolate from 1% to 3%, by weight, of starch and from 0.01% to 0.2% of a stabilizing gum, and heating the mixture to a temperature above the gelatinizing temperature of the starch.

9. Method of making a stable chocolate and milk suspension which consists in adding to the mixture of milk and chocolate from 1% to 3%, by weight, of starch and from 0.01% to 0.2% of a stabilizing gum, and heating the mixture to a temperature above the gelatinizing temperature of the starch but below the coagulating temperature of the milk casein.

10. A chocolate and milk suspension containing gelatinized starch and a smaller quantity of a stabilizing gum.

11. A chocolate and milk suspension containing gelatinized modified corn starch and a smaller quantity of a stabilizing gum.

12. A chocolate and milk suspension in which the milk albumen is coagulated while the casein is substantially uncoagulated, containing gelatinized starch and a stabilizing gum.

13. A chocolate and milk suspension in which the milk albumen is coagulated while the casein is substantially uncoagulated, containing gelatinized starch and a stabilizing gum in which the gum is present in proportion between one part and twenty parts of the gum to one hundred parts of the starch.

14. A chocolate and milk suspension in which the milk albumen is coagulated while the casein is substantially uncoagulated, containing from 1% to 3% of gelatinized starch and from 0.01% to 0.2% of a stabilizing gum.

15. A chocolate and milk suspension containing from 1% to 3% of gelatinized corn starch and from 0.01% to 0.2% of a stabilizing gum.

16. Method of making a stable chocolate suspension which consists in adding to the liquid vehicle modified corn starch and a much smaller quantity of a stabilizing gum, and heating the mixture to a temperature from 170° to 200° F.

17. Method of making a stable chocolate suspension which consists in adding to the liquid vehicle from 1% to 3% of starch and from 0.01% to 0.2% of a stabilizing gum, and heating the mixture to a temperature from 170° to 200° F.

18. Method of making a stable chocolate and milk suspension which consists in adding to the mixture of milk and chocolate modified corn starch and a much smaller quantity of a stabilizing gum and heating the mixture to a temperature between 170° and 200° F.

19. Method of making a stable chocolate and milk suspension which consists in adding to the mixture of milk and chocolate from 1% to 3%, by weight, of starch and from 0.01% to 0.2% of a stabilizing gum, and heating the mixture to a temperature between 170° and 200° F.

DAVID E. LINN.